United States Patent
Stehle et al.

(10) Patent No.: US 7,902,997 B2
(45) Date of Patent: *Mar. 8, 2011

(54) RETRIEVING AND PRESENTING DYNAMIC TRAFFIC INFORMATION

(75) Inventors: Tommy Allen Stehle, Kansas City, MO (US); Terrence Matthew Pallotto, Kansas City, MO (US); Christopher James Simon, Shawnee, KS (US); Timm J. Claudon, Naperville, IL (US)

(73) Assignee: HNTB Corporation, Kansas City, MO (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/394,964

(22) Filed: Feb. 27, 2009

(65) Prior Publication Data

US 2009/0160676 A1 Jun. 25, 2009

Related U.S. Application Data

(63) Continuation of application No. 11/316,567, filed on Dec. 21, 2005, now Pat. No. 7,511,634.

(60) Provisional application No. 60/638,739, filed on Dec. 22, 2004.

(51) Int. Cl.
*G08G 1/09* (2006.01)
(52) U.S. Cl. .......................... 340/905; 340/901; 340/907
(58) Field of Classification Search .................. 340/901, 340/907
See application file for complete search history.

(56) References Cited

U.S. PATENT DOCUMENTS

| | | | |
|---|---|---|---|
| 5,214,757 A | 5/1993 | Mauney et al. | |
| 5,214,793 A * | 5/1993 | Conway et al. | 455/500 |
| 5,592,172 A * | 1/1997 | Bailey et al. | 342/350 |
| 5,917,948 A | 6/1999 | Holtz | |
| 5,969,973 A | 10/1999 | Bourne et al. | |
| 6,111,539 A | 8/2000 | Mannings et al. | |
| 6,184,823 B1 | 2/2001 | Smith et al. | |
| 6,219,696 B1 | 4/2001 | Wynblatt et al. | |
| 6,236,933 B1 | 5/2001 | Lang | |
| 6,317,682 B1 * | 11/2001 | Ogura et al. | 701/117 |
| 6,426,761 B1 | 7/2002 | Kanevsky et al. | |
| 6,574,556 B2 | 6/2003 | Fish et al. | |
| 6,728,628 B2 | 4/2004 | Peterson | |
| 6,741,161 B1 * | 5/2004 | Kim et al. | 340/7.1 |
| 6,745,123 B1 | 6/2004 | Petzold et al. | |
| 6,826,473 B1 | 11/2004 | Burch et al. | |
| 6,845,316 B2 | 1/2005 | Yates | |
| 6,859,688 B1 | 2/2005 | Orf et al. | |
| 6,967,592 B2 * | 11/2005 | Bell et al. | 340/905 |
| 7,027,915 B2 | 4/2006 | Craine | |

(Continued)

OTHER PUBLICATIONS

Houston TranStar, retrieved from the Internet Archive Wayback Machine with a publication date of Dec. 15, 2003, http://web.archive.org/web/20031215221052/web.houstontranstar.org.

(Continued)

*Primary Examiner* — Travis R Hunnings
(74) *Attorney, Agent, or Firm* — Shook, Hardy & Bacon LLP

(57) ABSTRACT

A system, a method and computer-readable media for presenting dynamic traffic information. A user profile is stored, and advisory data based on the user profile is gathered. The advisory data may include traffic information associated with road segments identified by the user profile. Upon receiving a user input, the advisory data is presented to a user.

15 Claims, 11 Drawing Sheets

U.S. PATENT DOCUMENTS

| | | | |
|---|---|---|---|
| 7,031,838 | B1 | 4/2006 | Young et al. |
| 7,116,326 | B2 | 10/2006 | Soulchin et al. |
| 7,203,595 | B1 | 4/2007 | Auxer et al. |
| 7,511,634 | B2 * | 3/2009 | Stehle et al. .................. 340/905 |
| 2001/0022862 | A1 | 9/2001 | Alm |
| 2001/0024203 | A1 | 9/2001 | Yamada et al. |
| 2001/0028364 | A1 | 10/2001 | Fredell et al. |
| 2001/0030667 | A1 | 10/2001 | Kelts |
| 2002/0027512 | A1 * | 3/2002 | Horita et al. .................. 340/988 |
| 2002/0083331 | A1 | 6/2002 | Krumel |
| 2002/0158922 | A1 | 10/2002 | Clark et al. |
| 2002/0198694 | A1 | 12/2002 | Yang et al. |
| 2002/0198878 | A1 | 12/2002 | Baxter et al. |
| 2004/0008225 | A1 | 1/2004 | Campbell |
| 2004/0054465 | A1 * | 3/2004 | Hamaguchi et al. .......... 701/208 |
| 2004/0243299 | A1 | 12/2004 | Scaer et al. |
| 2005/0021225 | A1 * | 1/2005 | Kantarjiev et al. ............ 701/204 |
| 2005/0027442 | A1 * | 2/2005 | Kelley et al. .................. 701/202 |
| 2005/0064936 | A1 | 3/2005 | Pryor |
| 2006/0074544 | A1 | 4/2006 | Morariu et al. |
| 2006/0178807 | A1 * | 8/2006 | Kato et al. .................... 701/117 |
| 2006/0241987 | A1 * | 10/2006 | Pallotto et al. .................... 705/7 |
| 2008/0071466 | A1 * | 3/2008 | Downs et al. ................. 701/117 |

OTHER PUBLICATIONS

Patent Cooperation Treaty (PCT) International Search Report, Sep. 24, 2008, 8 pps.

U.S. Appl. No. 11/313,520, Final Office Action, mailed Apr. 2, 2009.
U.S. Appl. No. 11/313,520, non-Final Office Action, mailed Sep. 24, 2009.
U.S. Appl. No. 11/313,520, non-Final Office Action, mailed Sep. 26, 2008.
U.S. Appl. No. 11/314,607, Advisory Action, mailed Oct. 23, 2008.
U.S. Appl. No. 11/314,607, Final Office Action, mailed Jun. 12, 2009.
U.S. Appl. No. 11/314,607, Final Office Action, mailed Aug. 19, 2008.
U.S. Appl. No. 11/314,607, non-Final Office Action, mailed Jan. 16, 2009.
U.S. Appl. No. 11/314,607, non-Final Office Action, mailed Feb. 20, 2008.
U.S. Appl. No. 11/314,607, Notice of Allowance, mailed Oct. 9, 2009.
U.S. Appl. No. 11/314,607, Notice of Allowance, mailed Dec. 22, 2009.
U.S. Appl. No. 11/316,567, Final Office Action, mailed Mar. 27, 2008.
U.S. Appl. No. 11/316,567, non-Final Office Action, mailed Sep. 20, 2007.
U.S. Appl. No. 11/316,567, Notice of Allowance, mailed Nov. 17, 2008.
U.S. Appl. No. 11/316,135, Final Office Action, mailed Nov. 15, 2010.

* cited by examiner

| Routes | Actual/Expected Travel-Time (Min) | Speed (MPH) | Volume (Cars Per/Hour) | Occupancy (% Occupied) |
|---|---|---|---|---|
| SB I-43 to Marquette Interchange | No Data | 51 | 256 | 2 |
| SB I-43 to SB I-43/94 | No Data | 52 | 336 | 2 |
| EB I-94 to SB I-43/94 | No Data | 55 | 644 | 5 |
| EB I-94 to EB I-794 | No Data | 55 | 846 | 6 |

FIG. 10

RETRIEVING AND PRESENTING DYNAMIC TRAFFIC INFORMATION

CROSS-REFERENCE TO RELATED APPLICATIONS

This application is a continuation of U.S. Non-provisional application Ser. No. 11/316,567, filed Dec. 21, 2005, now pending, entitled "RETRIEVING AND PRESENTING DYNAMIC TRAFFIC INFORMATION," which is herein incorporated by reference, and which claims the benefit under 35 U.S.C 119(e) (as does this application) of U.S. Provisional Application No. 60/638,739, entitled "METHOD AND SYSTEM FOR CONVERGING COMMUNICATIONS OF PUBLIC INFORMATION AND TRAVEL INFORMATION VIA WEB PRESENTATIONS" and U.S. Provisional Application No. 60/639,060, entitled "METHOD AND SYSTEM FOR RETRIEVING AND PRESENTING DYNAMIC DATABASE INFORMATION," both filed Dec. 22, 2004. These provisional applications are hereby incorporated by reference as well.

This application is related by subject matter to the inventions disclosed in the following commonly assigned applications, which are hereby incorporated by reference: U.S. patent application Ser. No. 11/313,520, entitled "GEOMETRY CREATION TOOL"; U.S. patent application Ser. No. 11/316,135, entitled "COMMUNICATION OF PROJECT INFORMATION"; and U.S. patent application Ser. No. 11/314,607, entitled "METHOD AND SYSTEM FOR PRESENTING TRAFFIC-RELATED-INFORMATION."

STATEMENT REGARDING FEDERALLY SPONSORED RESEARCH OR DEVELOPMENT

Not applicable.

BACKGROUND

With the complexity surrounding modern construction projects, dissemination of project information can be a formidable task. For example, a roadway construction project can impact millions of people every day as they travel the effected roads. Further, it is common for large projects to involve many contributing organizations, as well as numerous stakeholders. As these projects may require years to complete, efficiently managing and distributing project information is a critically important task.

When handling project information, one of the many challenges is maintaining current information while avoiding outdated or stale content. As known to those in the art, project schedules change frequently and for a variety of reasons. Further, information may originate from numerous different sources. For example, consider a road construction project. Traffic data representing real-time conditions may be received from a traffic operations center, while construction phasing, closure schedules and alerts may be received from other entities and organizations. Of course, traffic data may be of interest regardless of whether a construction project is active on a given roadway.

Content management platforms for managing and distributing project information currently exist, but these platforms are neither capable of combining current project data from a variety of sources into a single interface nor capable of providing adequate messaging utilities for notification services. While web pages today may provide real-time traffic information, these web pages do not incorporate project information such as up-coming construction or event schedules. Further, these traffic interfaces do not permit user selection of routes for notifications or alert. Also, currently available systems are not capable of efficiently managing feedback from stakeholders with tools, for example, to handle electronic correspondence. Accordingly, there is a need, among other things, for improved systems and methods for managing and communicating information such as project information and traffic information.

SUMMARY

The present invention meets the above needs and overcomes one or more deficiencies in the prior art by providing systems and methods for presenting dynamic traffic information. In one aspect of the present invention, a computer-implemented method is provided. A user profile is stored. For example, the user profile may indicate road segments of interest to a user. Advisory data based on the user profile is gathered. The advisory data may include traffic information associated with the road segments identified by the user profile. Upon receiving a user input, the advisory data is presented to a user.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWING

The present invention is described in detail below with reference to the attached drawing figures, wherein:

FIGS. 8, 9 and 10 are screen displays for presentation in accordance with embodiments of the present invention.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for distributing and presenting information to a user. An exemplary operating environment for the present invention is described below.

Figure 1:
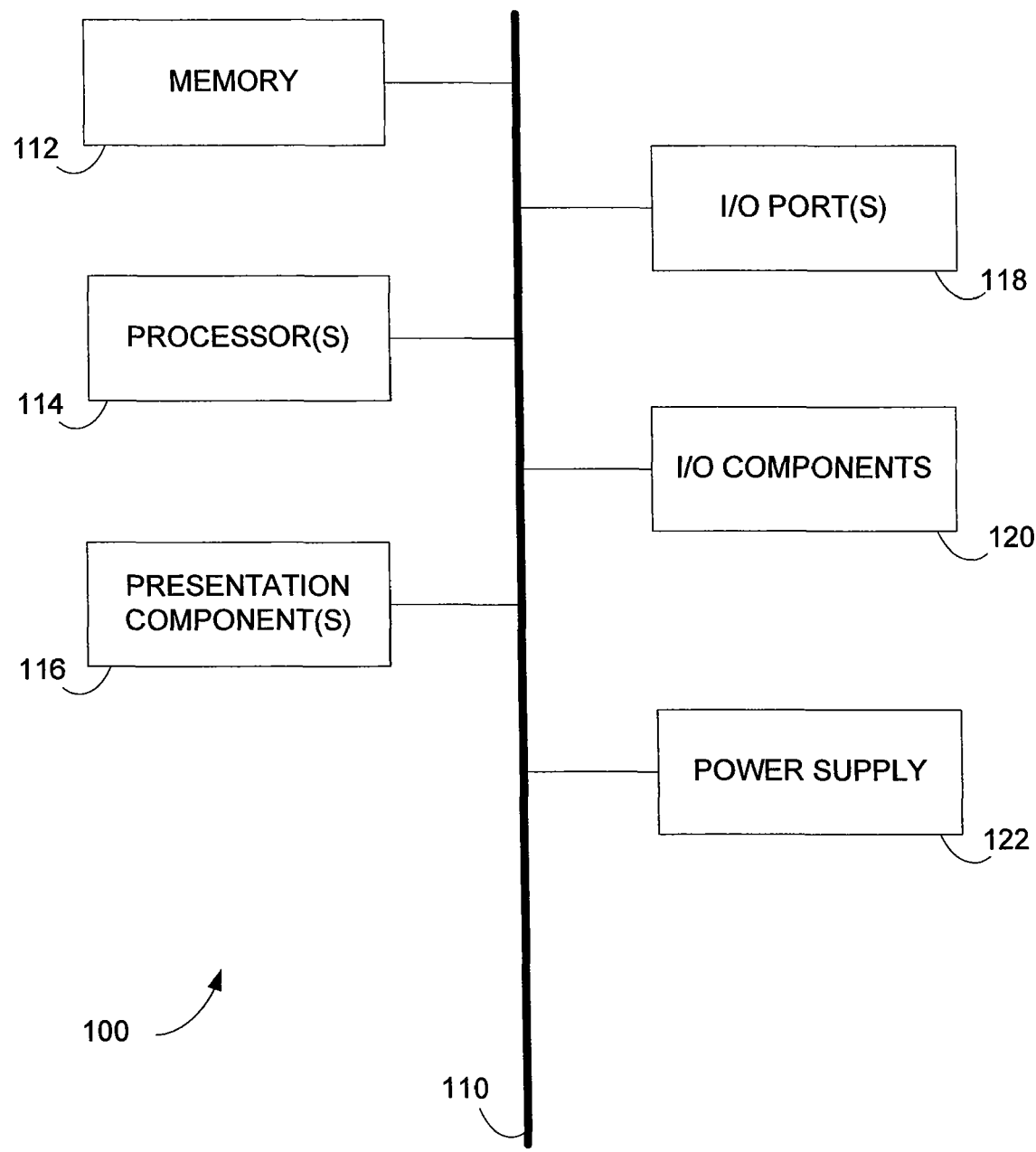
FIG. 1 is a block diagram of a computing system environment suitable for use in implementing the present invention.

Referring initially to FIG. 1 in particular, an exemplary operating environment for implementing the present invention is shown and designated generally as computing device 100. computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, the present invention includes an improved system for managing and presenting information related to a project. A variety of endeavors may be a "project", as the term is used herein. For example, construction projects are contemplated by the present invention. These construction projects may relate to land site development, roadway or other infrastructure construction or to the construction of buildings and other structures. The present invention may also be used along with non-construction projects. In sum, embodiments of the present invention may be used with any number of architectural, engineering or other projects.

Figure 2:
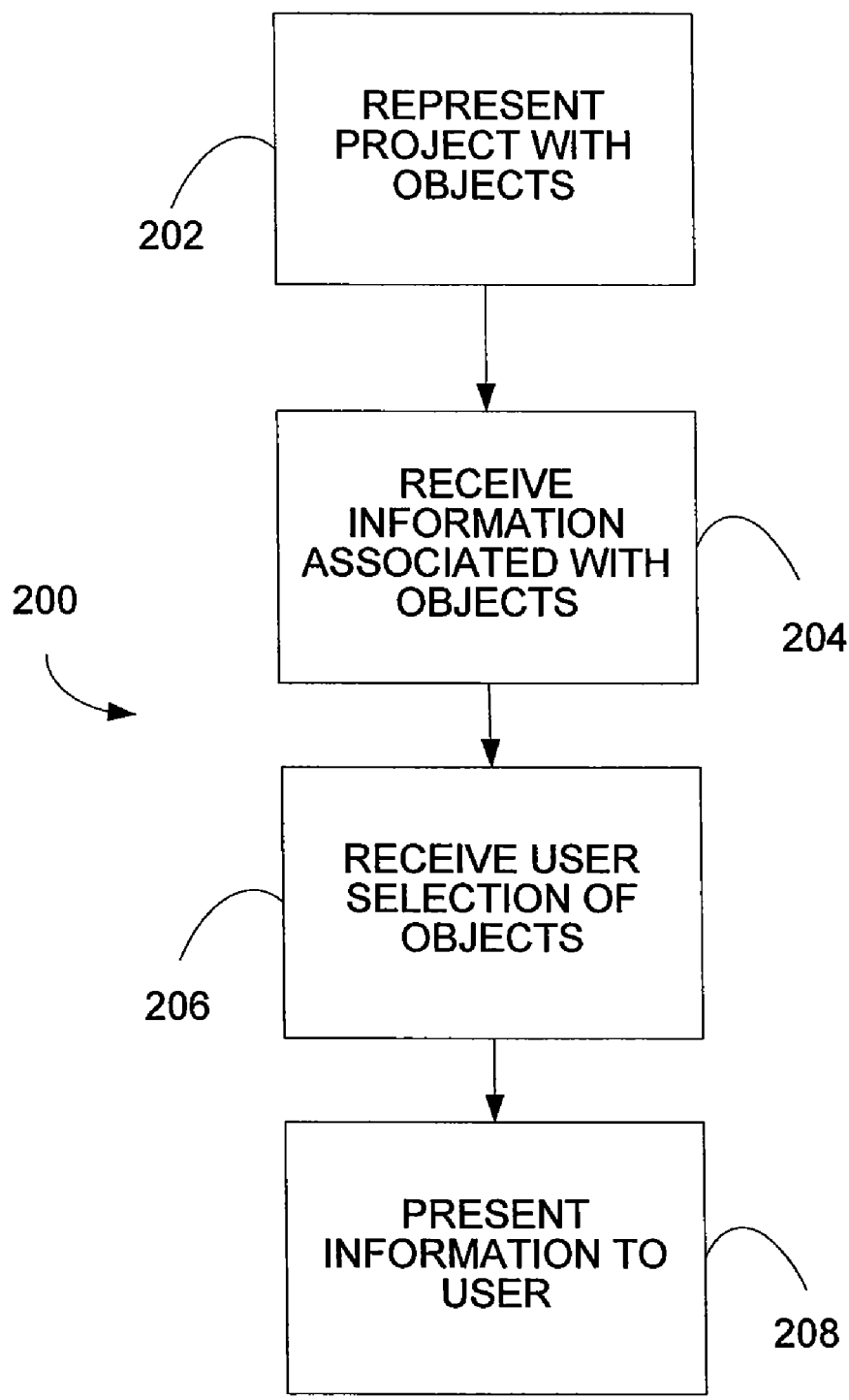
FIG. 2 illustrates a method in accordance with one embodiment of the present invention for presenting project information to a user.

FIG. 2 illustrates a method 200 for presenting project information to a user. At a step 202, the method 200 represents a project with multiple objects. A project may be divided into constituent parts, and each of these parts will have a relationship with the other parts and with the project as a whole. For example, the road segments undergoing construction and/or affected by the project can represent a roadway construction project. As another example, a site development project may be represented by the parcels of land within the site. A building project may be described by locations in the structure or by other divisions. As will be appreciated by those skilled in the art, there may be numerous ways to represent a project with objects.

At a step 204, the method 200 receives items of information related to the project. A wide variety of information may be received by the method 200, and the information may originate from many different sources. The information may relate to current conditions in the area affected by the project or may relate to project progress. The information may indicate scheduled project events and may lie out a timeline for the project's completion. The information may also be feedback and comments from stakeholders. In one embodiment, each item of information is associated with at least one of the objects. By associating information with objects, the received information can be intelligently organized. For example, real-time traffic data and scheduled lane closures may be associated with discrete road segments in a roadway construction project. By organizing the data in this manner, the current and future conditions on each of the various road segments may be examined and tracked.

The method 200, at a step 206, receives a user input selecting one of the objects. In one embodiment, the method 200 provides a user interface that includes a graphical representation of the project, as represented by the various objects. By using this interface, the user may select the graphic associated with an object of interest. For example, the user may be a commuter seeking roadway conditions on a particular roadway segment. As a further example, the user may be a project contributor tracking the project progress to ensure that it stays on schedule. Depending on the type of project, there may be numerous users having interest in some portion of the project and desiring the ability to receive project information in an efficient manner.

At a step 208, the method 200 presents information associated with the selected object to the user. Any number of techniques known in the art may be used for this presentation. Further, the presented information may be subject to a variety of content management and data security constraints. In one embodiment, the user is provided an interface to select objects and to view presented information. For example, a map of a site development project may be presented over the Internet. By selecting to view information associated with parcels of land within the site, a project contributor can track development of the various parcels. Those skilled in the art will recognize that any number of interfaces may be used to provide graphical representations of a project and to present information associated with selected segments.

Figure 3:
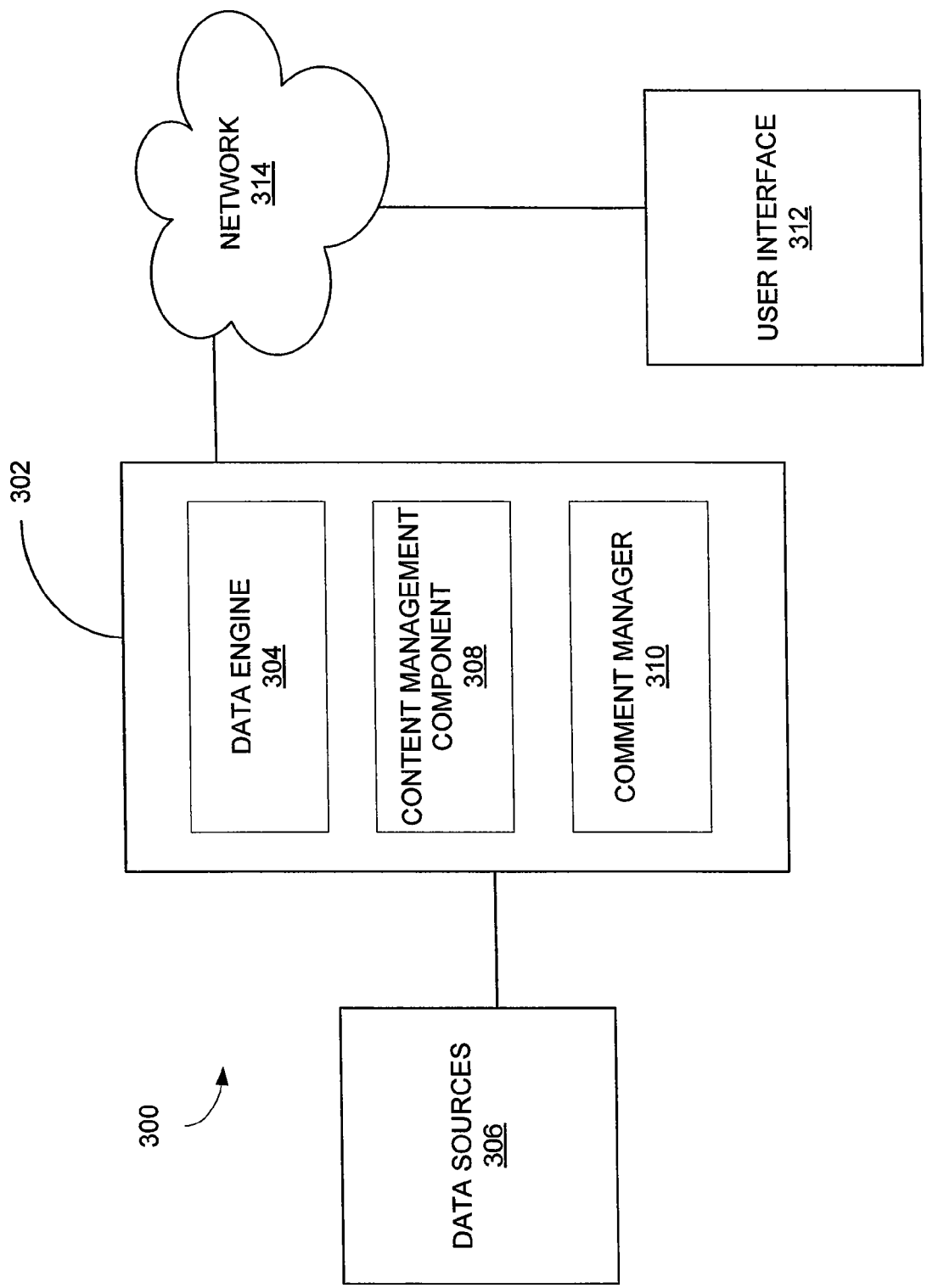
FIG. 3 is a schematic diagram illustrating a system for managing and presenting information related to a project in accordance with one embodiment of the present invention.

FIG. 3 illustrates a system 300 for managing and presenting information related to a project. The system 300 includes a platform 302. In one embodiment, the platform 302 provides integrated data management and messaging utilities designed for converging project information for presentation to users.

The platform 302 includes a data engine 304. The data engine 304 is an application that may be configured to process a variety of data for display within a graphic user interface. The data engine 304 may also provide messaging utilities for subscription-based notification services. The data engine 304 receives information in the form of digital data from data sources 306. As will be appreciated by those skilled in the art, there are many different forms of data that may relate to a project. As an example, consider a roadway construction project. Traffic speed and performance data are gathered from roadway sensors, while video is obtained from traffic cameras. Data, such as incidents, road closures or construction and detour information, is stored in a database, and computer-assisted dispatch data may be received from law enforcement agencies. Road condition and weather data are transmitted over roadway weather information systems, while text is presented on dynamic message signs. Roadway geometry is stored in CAD systems. In sum, the data sources 306 may provide a variety of data to the data engine 304 related to a project.

In addition to the project data received from the data sources 306, the data engine 304 may receive additional project information. As will be discussed, the platform 302 may be configured to manage and maintain information such as construction schedules and other documents relevant to a project. The data engine 304 may receive this additional project information and may enable its presentation.

The data engine 304 may process the received items of data/information by associating each item with a project object. As previously mentioned, multiple objects may represent a project. By associating data with project objects, the data associated with a segment can be presented to a user on demand. To accomplish this presentation, a user interface 312 may receive information from the platform 302 via a network 314. In one embodiment, the network 314 is the Internet, and the user interface 312 is provided as a web page.

Returning to the roadway construction project example, the user interface 312 may present a traffic map displaying the roads affected by the construction project. Traffic speed ranges on roadway segments may be indicated with colors, while actual speeds are displayed when the user selects a segment. Icons may be positioned within the user interface 312 to indicate available, location-specific data for incidents, traffic cam images and variable message signs text. Further, the user interface 312 may receive information such as construction phasing, closure schedules and alerts from a content management component 308. Each of these items of information may be associated with a road segment and presented by the user interface 312 upon a user's request.

In one embodiment, the various project objects (e.g., road segments) may be presented by representing the objects with graphical representations (e.g., a traffic map). These representations may be derived from CAD files or similar type files. As a project progresses, these files may also be updated to reflect current originations of the project objects. Accordingly, the graphical representation of the project will accurately depict the current status and location of project object.

The data engine 304 may distribute information via a variety of different methods. In addition to the user interface 312, the information may be distributed via e-mail, specialized application programs, web sites developed specifically for PDAs, palmtops and other wireless Internet-enabled devices, RSS (Really Simple Syndication) services using XML, or SMS (Short Message System) data for cell phones. The data engine 304 may also distribute information with other forms of public information delivery such as telematics or any applications that include vehicle-based electronic systems, mobile telephony, vehicle tracking and positioning, on-line navigation and information services and emergency assistance. As will be appreciated by those skilled in the art, the data engine 304, by associating items of information with project objects, can enable the distribution of a wide variety of project information via any number of distribution means.

The platform 302 also includes a content management component 308. The content management component 308 may manage a variety of content such as web site content, documents and media. The content management component 308 may manage information presented over the Internet, an intranet and/or an extranet. In one embodiment, the content management component 308 is designed to allow complex/modular cross content relationships and sorting. An administrator may establish these relationships with information (e.g., schedules, new items, events, and documents) made modular by the content management component 308.

The content management component 308 may contain a security model allowing administrative controls over content. Administrators may add, modify and delete authorized users and may maintain user profile data. Administrators may assign incremental access to content administration and security modules across multiple projects.

To manage content, the content management component 308 may include a variety of modules designed to handle types of content or content actions. One exemplary module may be a document assets module. The document assets module may allow remote uploading and organization of electronic document assets. As another exemplary module, an event scheduler module may be utilized to enter schedules of upcoming or past events. Content such as meeting agendas, handouts, photo files, study materials and other documents may be associated with these events. The content management component 308 may also include a module that handles news releases and a module that handles images. For example the image module may allow the remote upload and organization of electronic image assets (photos, scans, drawings) and may provide set creation for content modularity.

Content modules may be specific to a certain type of project. For a roadway construction project, a traffic information management module may allow manual or automatic entry of traffic alerts or public advisories within an online public presentation. In addition to administering alerts and advisories, the traffic information management module may allow control over construction and closure schedule information that will be provided to the public, stakeholders or a private audience. As will be appreciated by those skilled in the art, the content management component 308 may provide any number of modules capable of managing a wide variety of content.

The platform 302 further includes a comment manager 310. The comment manager 310 may be utilized for tracking, mining and managing feedback concerning a project. In one embodiment, the comment manager 310 offers subscriber-based services and provides archived and current message governance for data gathered from an audience. The comment manager 310 may operate as a repository for general public survey/stakeholder and response information, and it may provide tools to handle electronic correspondence and subscriber lists for mailings or online services. The comment manager may utilize the user interface 312 to receive comments and feedback. As the user interface 312 presents project information to interested parties, these parties are likely to have relevant feedback concerning the project.

The comment manager 310 may also include a correspondence manager that opens incoming correspondence from web site comment forms. The correspondence manager may draft and save e-mail responses for review and may send replies. As another example, the comment manager 310 may include a subscription manager that manages subscriber lists and profiles for online, e-mail, regular mail and other services. The comment manager 310 may utilize keywords or remarks to identify individual comments or groups of comments for later retrieval. A records database may be maintained, and custom utilities may generate and display statistical data on comments received. The comment manager 310 may also be configured to send mass e-mail messages to entire subscriber lists and to conduct general or invitation-only online surveys using web forms or more sophisticated media. Surveys can range from a simple collection of checkboxes, radio buttons and multiple-choice or yes/no questions to more sophisticated or custom-designed presentations with images, video, narration or other multimedia elements.

The comment manager 310 may manage a number of subscriber lists. These subscriber lists may be used for any number of services such as traffic alerts, email alerts and personalized email news. In one embodiment, public web site users can manage their subscriber profiles online, and unsubscribe to any or all services. Records from a subscriber database can be downloaded as delimited text files for use in mail merges or creating mailing labels.

Figure 4:
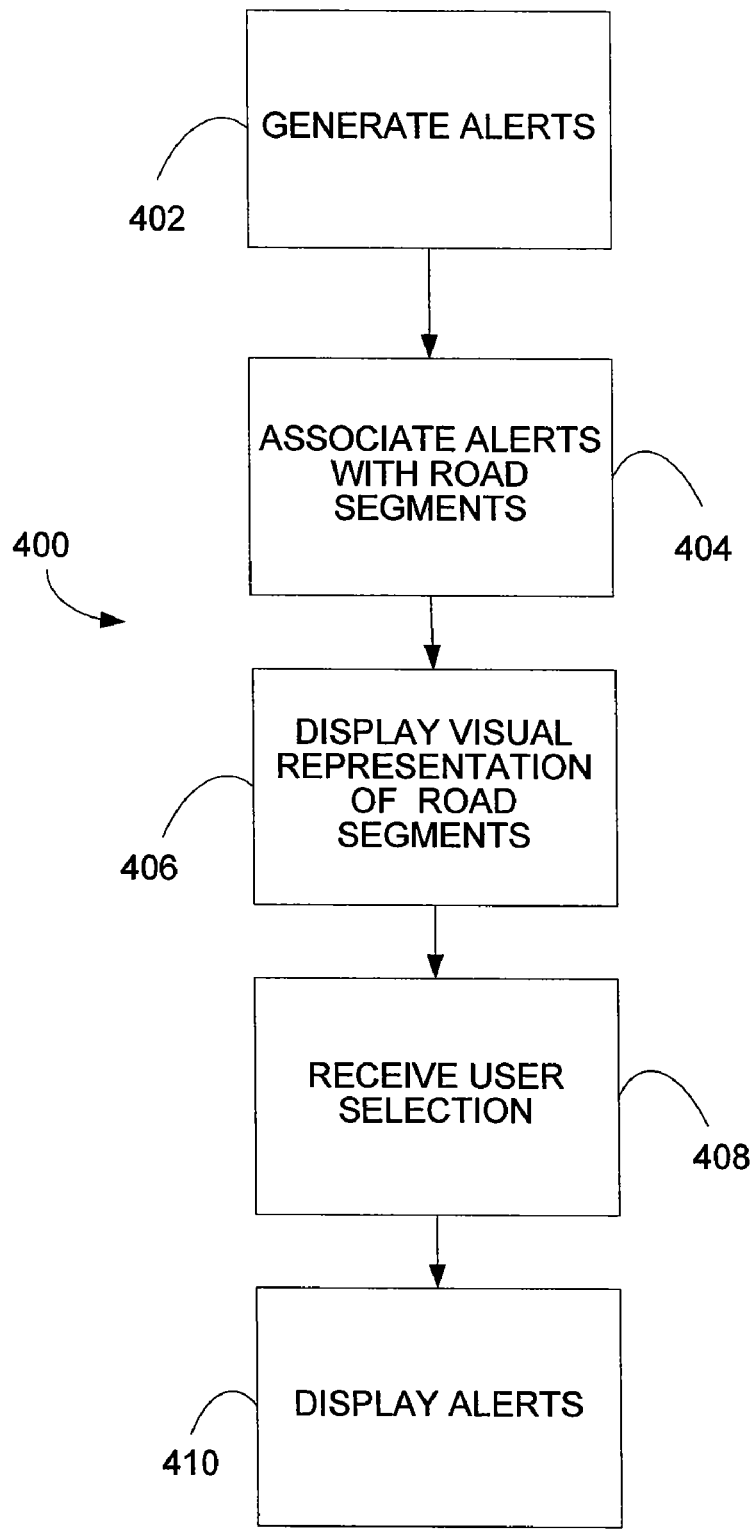
FIG. 4 illustrates a method in accordance with one embodiment of the present invention for distributing traffic information.

FIG. 4 illustrates a method 400 for distributing traffic information. The method 400, at a step 402, generates alerts describing scheduled events anticipated to affect traffic conditions. Any number of events may affect traffic conditions. For example, a construction project may cause traffic delays or dictate that traffic be rerouted/detoured. Popular events, such as concerts or sporting events, may be expected to affect traffic, and, thus, these events may also be the subject of alerts. In one embodiment, the alerts are generated by utilizing a schedule of events. One in possession of this schedule may identify events as expected to affect traffic and as being appropriate for basing an alert.

At a step 404, the method 400 associates the alerts with segments of road. In one embodiment, the method 400 may utilize a computer application such as the data engine 304 of FIG. 3 to associate alerts with the road segments. For example, an alert may indicate that a certain number of lanes will be closed on a highway. This alert may be associated with each road segment affected by the lane closure. Those skilled in the art will appreciate any number of data storage techniques known in the art may be acceptable for storing representations of road segments and for associating alerts with the road segment in a data store.

The method 400, at a step 406, provides a visual representation of the road segments in a user interface. In one embodiment, a traffic map is provided over the Internet as a web page. In other embodiments, the visual representation is provided as text data appropriate to be displayed, for example, on a cellular telephone. The visual representation may reflect the current real-time traffic conditions on the road segments. For example, the roads may be color-coded to reflect the average speed of traffic. The user interface may include navigation controls for the user to view road segments of interest and to zoom in and out on the presentation. Additional controls may also be provided to allow the user to select the type of information that is displayed. For example, the user interface may allow the user to view predicted future occupancy or usage of the roads. Historic traffic data may be used to predict this future use. Similarly, the user interface may allow the user to view how the roads will change as the construction project progresses. As the method 400 may interact with a schedule of events, this schedule may be used to predict the future traffic occupancy/usage and the future placement of the road segments.

At a step 408, the method 400 receives a user input selecting a road segment. Depending on the interface displayed at the step 406, any number of techniques may be utilized to receive the user input. For example, the user may use a mouse to select a segments displayed on a traffic map. Text-based interfaces may also have input methods allowing a user to select a road segment. In one example, the user may select road segments of interest, and these segments may be stored as part of a user profile.

The method 400, at a step 410, displays the alerts associated with the selected road segments. In one embodiment, the alerts are provided in the user interface. As another example, the alerts may be communicated via email or other messaging means. The method 400 may use a user profile to determine which users should receive an alert. As will be appreciated by those skilled in the art, because the alerts are associated with road segments in a data store, the method 400 may access the data store, identify the alerts associated with the selected segment and retrieve these alerts for presentation to a user.

Figure 5:
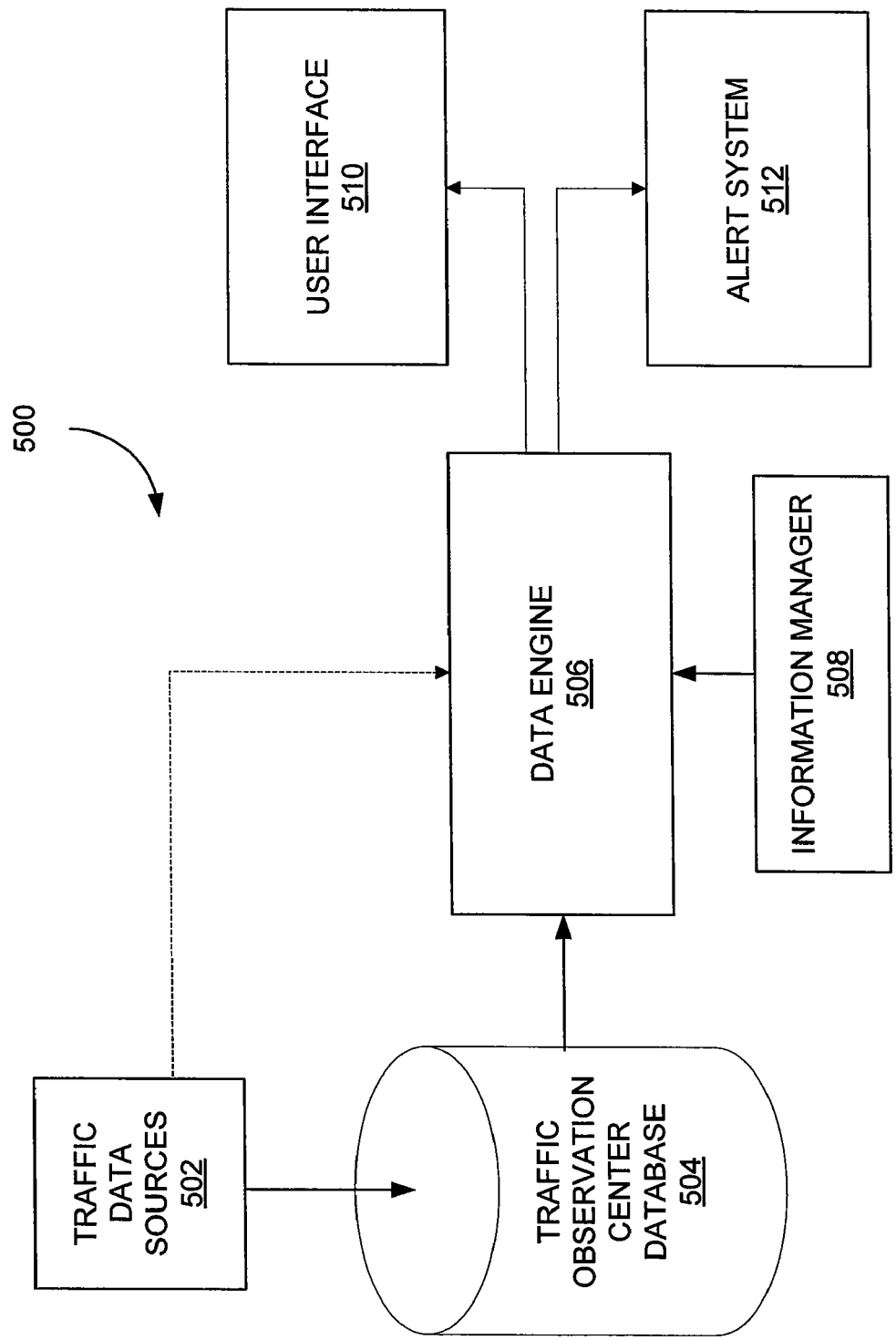
FIG. 5 is a schematic diagram illustrating a system for managing and presenting traffic information in accordance with one embodiment of the present invention.

FIG. 5 illustrates a system 500 for managing and presenting traffic information. It should be noted that, while the system 500 is directed towards traffic information, a wide variety of projects could utilize a system such as the system 500. The system 500 utilizes traffic data gathered from a variety of traffic data sources 502. The traffic data sources 502 may include a variety of different devices. For example, sensors may monitor the speed of traffic, while cameras may capture images and video of the traffic. The traffic data sources 502 may also indicate active incidents and the text displayed on roadway signs.

The system 500 also includes a traffic observation center database 504. The database 504 may receive a portion of the traffic data from the traffic data sources 502. In one embodiment, the traffic observation center database 504 receives a variety of the traffic data and utilizes the data to calculate speed, performance and estimated travel times on the monitored roads. Those skilled in the art will recognize that a database such as the traffic observation center database 504 may be maintained by a regional transportation authority or may be privately maintained. In either case, the traffic observation center database 504 may be configured to receive and store a wide variety of traffic data and to use the data to describe and report traffic conditions.

A data engine 506 is included in the system 500. The data engine 506 is configured to receive data from the traffic observation center database 504. For example, an application on the traffic observation center database 504 may generate a data stream that is transmitted to the data engine 506. In one embodiment, the data stream has an XML format, and the data stream may be made available to broadcast media and other information providers. In this way, the data stream may have value beyond its use in the system 500. The data engine 506 may also receive data directly from the traffic data sources 502. For example, a video feed from a traffic camera may be transmitted directly to the data engine 506. The data engine 506 may also receive information from an information manager 508. The information manager 508 may store a variety of information relevant to traffic conditions. For example, the information manager 508 may store construction schedules defining road closures and roads changes caused by a construction project.

Upon receiving the traffic data, the data engine 506 may be configured to gather, organize and/or format the data for display on a user interface 510 and for transmission via an alert system 512. For example, the data engine 506 may be configured to associate received data with a section of roadway. As the roadways may be represented with discrete pieces of geometry in the data engine 506, the received data can be organized by relating information with pieces of geometry. Various techniques for such data storage and organization are known in the art. When the user interface 510 requests display of traffic data, the data engine 506 may communicate such information to the user interface 510, organized by roadway segment. Similarly, alerts provided by the alert system 512 may include information related to a roadway segment of interest.

As an example, the traffic data received by the data engine 506 may indicate that lanes on a particular road segment will be closed for a scheduled period of time. In one embodiment, this closure information is received from the information manager 508, and the information includes a beginning date and end date for the closure. The data engine 506 may display the closure information on the user interface 510 along with the display of the affected road segment. The data engine 506 may also enable the alert system 512 to generate alerts notifying subscribers of the closure. The information manager 508 may also provide custom alerts. For example, a festival may affect traffic on a roadway segment. An alert associated with this festival may be communicated to the data engine 506, and the data engine 506 may enable presentation of this custom alert on the user interface 510 and by the alert system 512.

Figure 6:
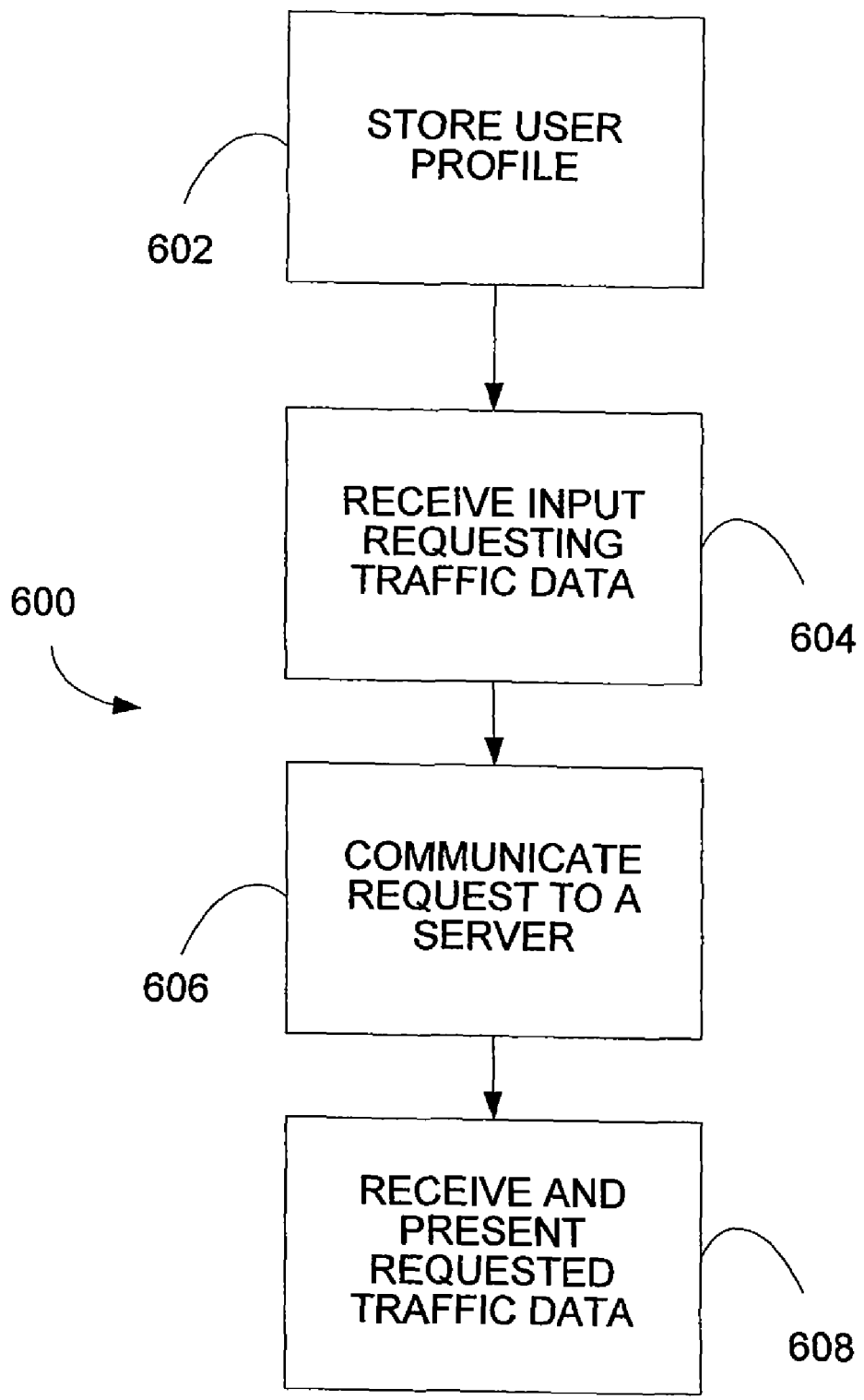
FIG. 6 illustrates a method in accordance with one embodiment of the present invention for presenting dynamic traffic information to a user.

FIG. 6 illustrates a method 600 for presenting dynamic traffic information to a user. At a step 602, the method 600 stores a user profile that includes user settings. A variety of information may be stored in the user's profile. In one embodiment, the method 600 may utilize an application program residing on a user's computer. The application program may include an interface in which a user may indicate road segments of interest. For example, a user may input their route to work. The profile may also indicate the type of information that a user desires to view. A user may specify which alerts they would like to view and/or how often the information should be updated.

The method 600 receives a user input requesting traffic data at a step 604. A wide variety of traffic information may be presented by the method 600. For example, the current speed, volume and occupancy of roadways may be displayed. Further, incident reports, road closures and other advisories may be presented. A user input may request this traffic data, and any number of inputs may be received at the step 604.

In response to the user input, at a step 606, the method 600 communicates a request to a server. In one embodiment, an application program may contact the server over the Internet. The server may house the traffic data, and the server may be in communication with a database of traffic information such as the traffic observation center database 504 of FIG. 5. The server may also be in communication with a data engine such as the data engine 506 of FIG. 5. In sum, the server may have access to a broad array of traffic information from multiple sources.

The server may be running a web service configured to receive the request communicated at the step 606. In one embodiment, the request incorporates information from a user's profile. For example, the profile may store routes of interest to a user. In this case, the request may include an indication of these selected routes, as well as the types of information desired by the user. In response to the request, the server may query its data store and identify traffic information responsive to the request. This information may then be communicated to the user's computer.

At a step 608, the method 600 receives and presents the requested traffic information. Any number of presentation techniques may be acceptable for the present invention. For example, the server may communicate the traffic information for display by the application. In one embodiment, the information is presented by the server as a dynamically generated web page. In this way, the user may refresh the traffic data and navigate to additional information of interest in the context of an Internet browser. The dynamic generation of a web page in response to a user request is well known in the art.

Figure 7:
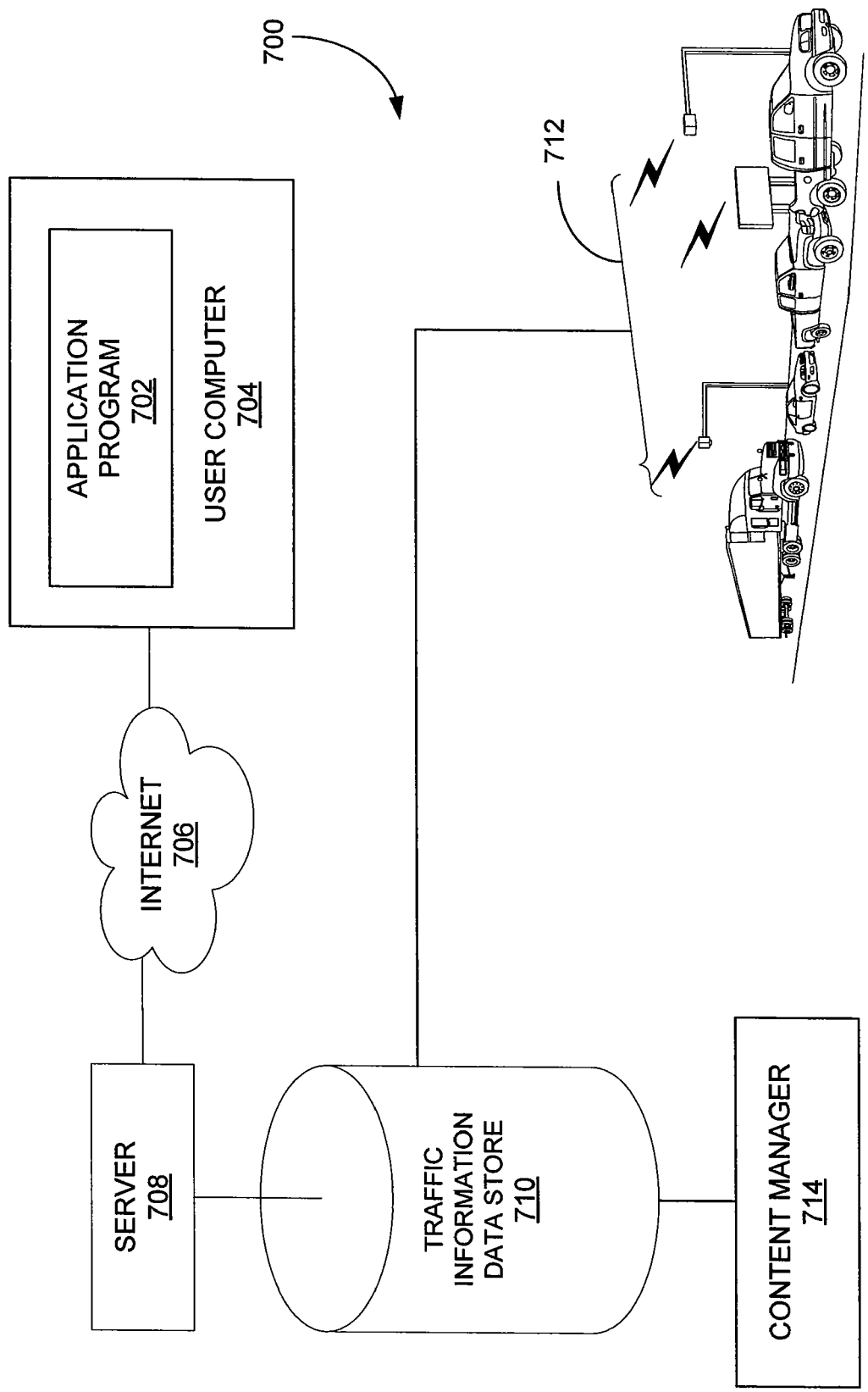
FIG. 7 is a schematic diagram illustrating a system for distributing roadway traffic information in accordance with one embodiment of the present invention.

FIG. 7 illustrates a system 700 for distributing roadway traffic information. The system 700 includes an application program 702. The application program 702 may reside on a user computer 704. The application program 702 may store a user's profile that identifies road segments of interest to a user. The profile may also indicate the types of alerts a user desires. For example, the user may choose to receive traveler alerts, performance information and/or closure information. Further, the application program 702 may provide any number of interfaces for presenting traffic information.

The application program 702 may be configured to access traffic information over a network, such as the Internet 706. Via the Internet 706, the application program 702 may interact with a server 708 to obtain traffic information. The server 708 may have access to a wide variety of information relevant to traffic conditions. For example, the server 708 may be in communication with a traffic information data store 710. The data store 710 may store a wide variety of traffic information from a variety of sources. In one embodiment, the data store 710 includes a relational database in which items of traffic information are associated with segments of roadway.

To gather traffic information, roadside devices 712 may collect information such as traffic speed, digital images/video and text from road signs and may communicate this information to the data store 710. The information from the roadside devices 712 may be used to calculate other measures of traffic performance such as traffic volume and the percent occupancy of the roads. These measures may also be stored in the data store 710. The data store 710 may also receive information relevant to traffic conditions from a content manager 714.

The content manager 714 may save information such as construction and lane closure schedules. The content manager 714 may also communicate customized alerts to the data store 710.

The application program 702 may communicate a request for traffic data to the server 708. Embedded in the request may be an indication of routes of interest, as indicated by a user's profile. The request may also indicate the type of information desired by the user. Responsive to this request, the server 708 may query the data store 710 for the requested information and may return relevant data to the application program 702. In one embodiment, the application program 702 may receive traffic data from the server 708 when the program 702 is launched. Subsequently, the application program 702 recurrently communicates with the server 708 to determine changes to the traffic information. For example, the application program 702 may check for updated information every 10 minutes. If new information exists, the application program 702 may notify the user of the updated information. In one embodiment, the application program 702 displays an icon on the user's screen, and, when a new update is detected, the icon flashes and changes color.

When a user indicates a desire to view traffic information, the application program 702 communications a request to the server 708 and receive the traffic information. Any number of interfaces may be acceptable for presentation of the traffic information. In one embodiment, the server 708 may return the requested information as a web page, and the application program 702 may enable presentation of the web page. For example, the server 708 may dynamically generate the web page upon receiving the request from the application program 702. Techniques for such dynamic generation and presentation of web pages are well known in the art.

Figure 8:
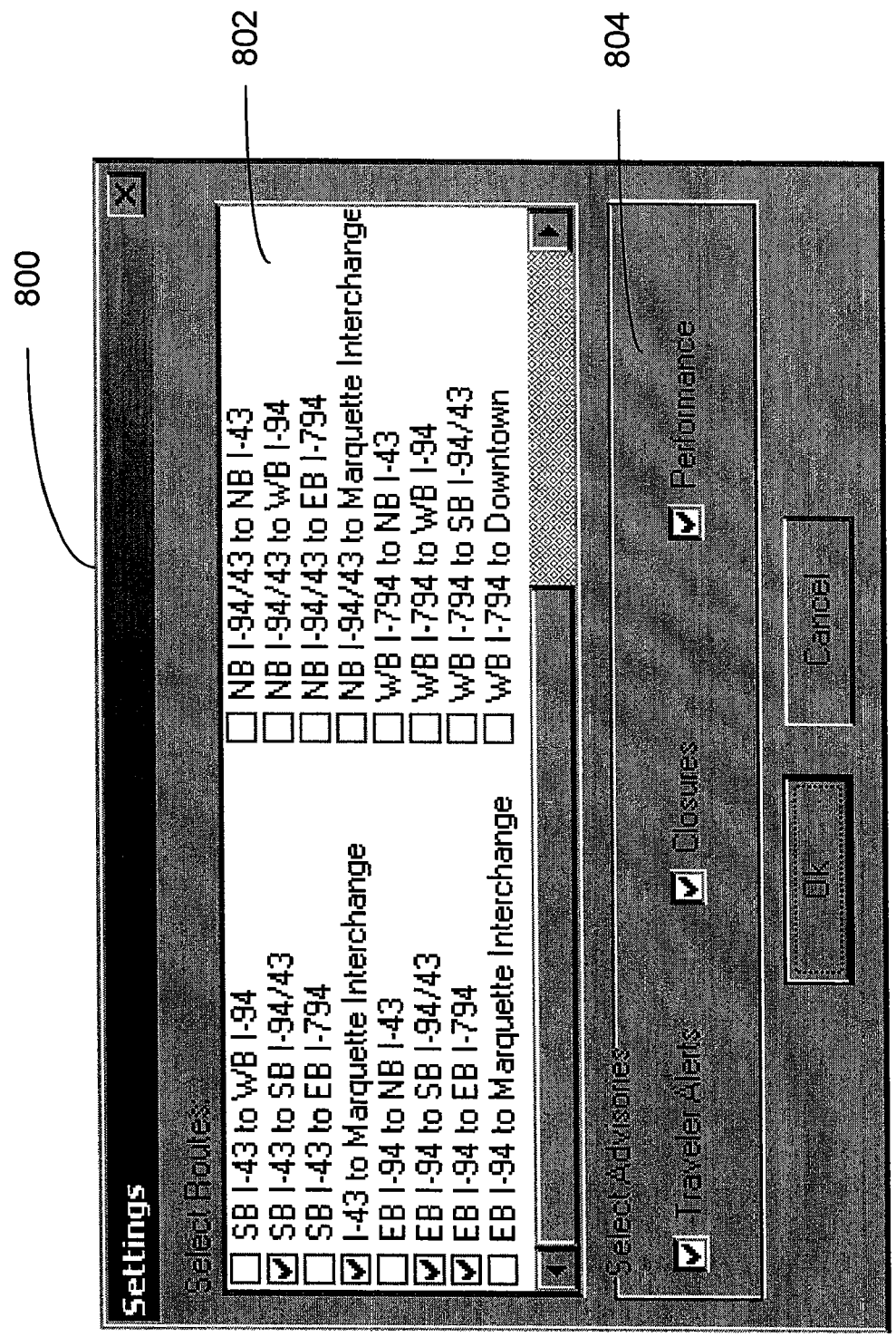
Figure 9:
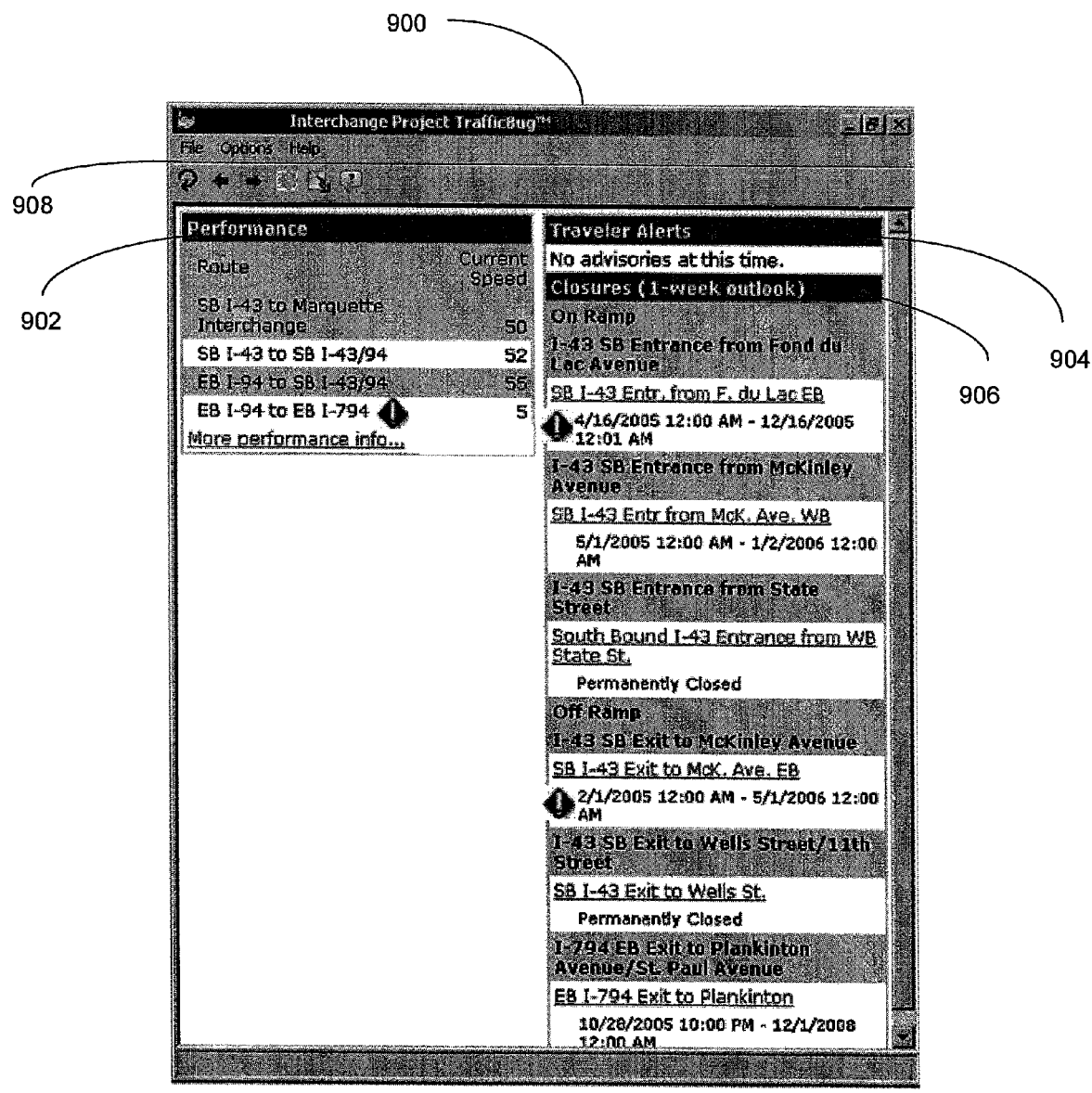

FIGS. 8, 9 and 10 illustrate screen displays for presentation to a user in accordance with an embodiment of the present invention. FIG. 8 illustrates a screen display 800 that allows a user to input information relevant to the user's profile. Using the screen display 800, the user may create a profile for use with a system such as the system 700 of FIG. 7. The screen display 800 includes a route selection area 802. The route selection area 802 lists segments of roadway (i.e., routes) that the user may have an interest in obtaining traffic information. The user may select a particular route by clicking a user-selectable check box. For example, a user may select each road segment upon which he commonly travels.

The screen display 800 also includes an advisory selection area 804. In one embodiment, three types of advisory data are available: performance, traveler alerts and closures. Performance advisory data shows current traffic speeds for single or dual-segment travel route definitions. Actual speeds may be shown for single segment routes, while average speeds are shown for dual-segment routes. Traveler alerts may be entered manually by a project team and may describe unscheduled spot-closures or unanticipated situations that may affect traffic flow for extended periods. Traveler alerts may also include crash or other real-time incident information. The closures advisory data displays information such as scheduled off-ramp, on-ramp, local street or mainline closures. For example, the closures listed may be those that will begin or be in progress during the next seven-day period. In one embodiment, records are displayed from a closure database, which is programmed long-term with long-term closure schedule and adjusted short-term as needed.

Turning to FIG. 9, a screen display 900 is presented, and the screen display 900 may display desired traffic information. As previously discussed, a request for traffic information may be transmitted to a server over the Internet, and the server may communicate information responsive to this request. To display the received information, the screen display 900 may be utilized. The screen display 900 includes a performance display area 902 in which performance advisory data is presented. For example, the performance display area 902 may present the current speed of traffic on the routes indicated by a user's profile. In one embodiment, if the speed of a segment falls below a predetermined threshold (e.g., 20 miles per hour), the performance display area 902 presents an icon alert with the route. For example, the route "EB I-94 to EB I-794" includes an icon alert because the current speed is only 5 miles per hour.

The screen display 900 also includes a traveler alert display area 904 and a closures display area 906. A variety of information may be displayed in the areas 904 and 906, and the presented information may vary based on the user's profile. Also, icon alerts may indicate important or newly added advisories. Finally, the screen display 900 includes a toolbar 908 having a number of user-selectable tools. For example, the toolbar 908 may allow the user to update (refresh) the information presented on the display areas 902, 904 and 906. The toolbar 908 may also allow the user to alter profile settings and to specify routes and advisory of interest. In sum, any number of tools may be provided by the toolbar 908.

The screen display 900 may also provide links to additional information. For example, the performance display area 902 includes an option to view "More performance info . . . " FIG. 10 presents an exemplary screen display 1000 that provides such supplemental performance information. The screen display 1000 presents a performance display area 1002. The performance display area 1002 includes "Actual/Expected Travel-Time (Min.)," which shows the amount of time to travel through the segment(s) named verses the typical travel time in off-peak traffic periods. The display area 1002 also includes the current traffic speed and the volume of traffic on the roadway segment, expressed in cars per hour. An occupancy measure is also included. One hundred percent occupancy describes a roadway completely occupied by vehicles (i.e., bumper to bumper) traveling at the posted speed limit. It should be noted that FIGS. 8, 9 and 10 illustrate merely exemplary screen displays, and the present invention is not limited to any one type of screen display, interface or platform.

Figure 11:
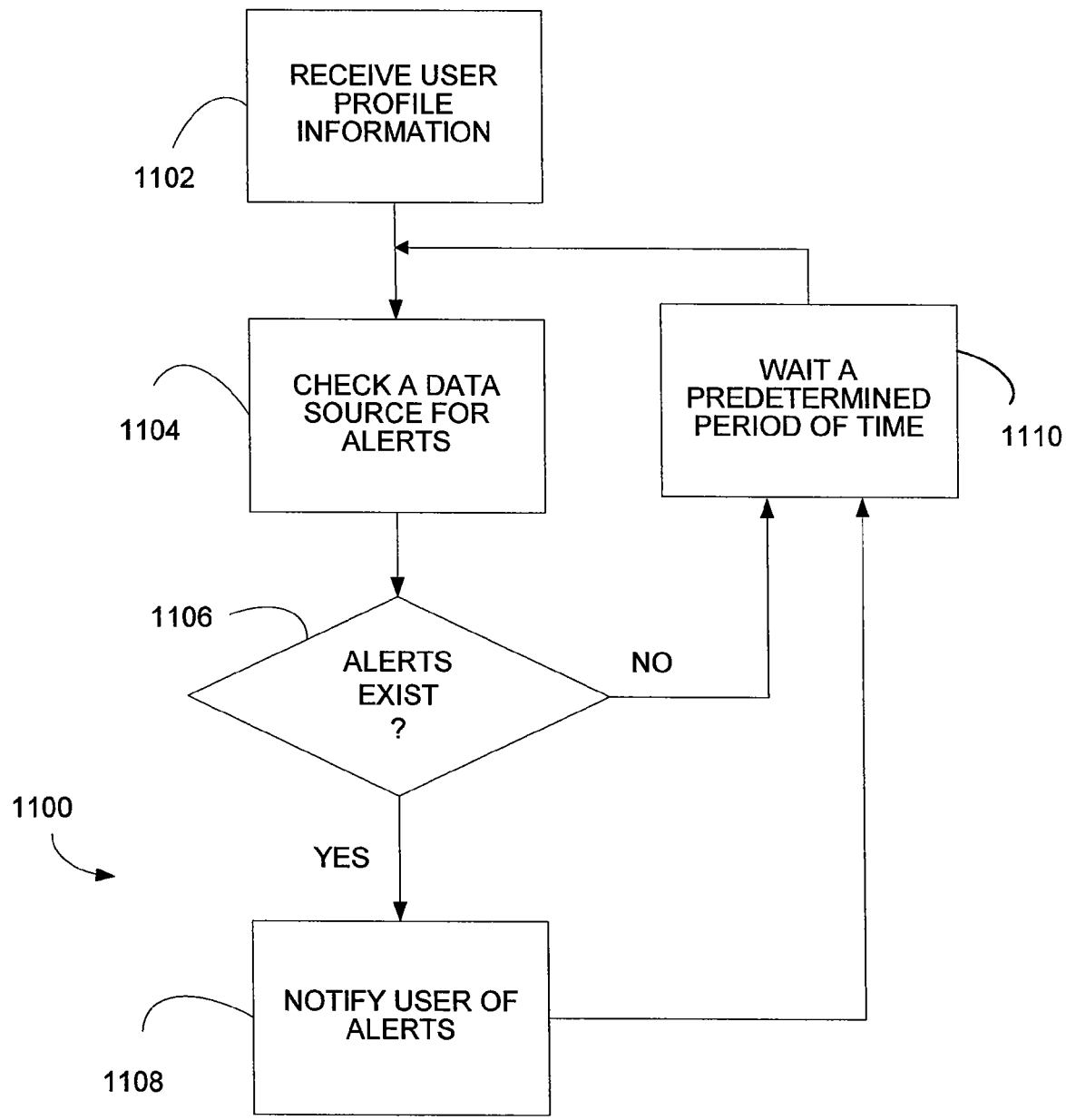
FIG. 11 illustrates a method in accordance with one embodiment of the present invention for distributing traffic information to a user.

FIG. 11 illustrates a method 1100 for distributing traffic information to a user. At a step 1102, the method 1100 receives user profile information. A variety of information may be stored as user profile information. For example, the information may indicate road segments of interest and/or the type of information that a use desires to view.

At a step 1104, the method 1100 checks a data source for traffic alerts that may of interest to user. In one embodiment, the data source may be accessible over the Internet and may store a wide variety of traffic data. Utilizing the user profile information, the method 1100 may determine road segments of interest to a user and may contact the data source to obtain traffic information associated with these road segments. The data source may store alerts that indicate any number of different conditions affecting traffic. For example, alerts may relate to road closures or construction schedules. Alerts may indicate sporting or other events that may lead to heavier than expected traffic. Further, accidents and unusually slow traffic conditions may trigger alerts.

The method 1100 determines whether alerts exist for road segments of interest at a step 1106. When such alerts do exist, the method 1100 notifies the user at a step 1108. A variety of notification techniques may be utilized by the method 1100.

For example, a message window may appear on the user's screen. As another example, an icon associated with a traffic information application may change color and blink in response to a new alert.

At a step 1110, the method 1100 waits a predetermined period of time before re-checking the data source for alerts. For example, the method 1100 may wait 10 minutes before re-establishing communication with the data source and checking for updated information and alerts. As will be appreciated by those skilled in the art, applications commonly wait a predetermined period of time when monitoring for changes to information or for new messages. By recurrently communicating with the data source once every time period, the method 1100 may keep the user up-to-date as to the current traffic condition on road segments of interest.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. One or more computer-readable non-transitory storage media having computer-useable instructions embodied thereon to perform a method for presenting dynamic traffic information, said method comprising:
   by way of an Internet browser, presenting on a computing device a traffic map;
   receiving user input via said Internet browser that indicates a selection of one or more road segments displayed on said traffic map, wherein said user input is received by way of a pointing device that is operable to select said one or more road segments on said traffic map;
   maintaining a schedule of traffic events that list one or more future events expected to impact traffic conditions;
   gathering advisory data based on said user input and said schedule of said traffic events, wherein said advisory data includes predicted traffic occupancy or usage associated with said traffic events on said schedule;
   receiving a request from said computing device to present traffic data associated with said one or more road segments;
   dynamically generating a web page responsive to said request, and
   presenting said web page via said Internet browser, wherein said web page presents at least a portion of said advisory data associated with said one or more road segments.

2. The media of claim 1, wherein said advisory data includes at least one of performance data, traveler alerts and closures data.

3. The media of claim 1, wherein said gathering advisory data includes interacting with a data store over the Internet.

4. The media of claim 1, wherein said method further comprises notifying the user of one or more alerts associated with at least one of said one or more road segments.

5. A system for distributing roadway traffic information, said system comprising:
   a data source storing traffic data related to one or more road segments, wherein said traffic data includes at least one of performance data, traveler alerts and closures data for each of at least a portion of said one or more road segments, wherein said data source maintains a schedule of traffic events listing one or more future events expected to impact traffic and stores predicted traffic occupancy or usage generated by predicting the impact of said one or more future events on said traffic conditions; and
   an application program configured to store a user profile that identifies selected road segments and to obtain said traffic data associated with the selected road segments from said data source, wherein said application program is configured to present a traffic map and to receive user inputs selecting at least a portion of said one or more road segments displayed on said traffic map, wherein said user inputs are made via mouse clicks selecting road segments on said traffic map;
   wherein said application program is further configured to provide a dynamically-generated web page presenting at least a portion of said traffic data associated with said selected road segments, wherein the presented traffic data includes at least a portion of said predicted traffic occupancy or usage and at least a portion of said data indicating future placement of said selected road segments.

6. The system of claim 5, wherein said application program is further configured to provide a user interface for presenting at least a portion of said traffic data in response to a user request.

7. The system of claim 5, wherein said application program is further configured to monitor said traffic data by recurrently communicating with said data source.

8. The system of claim 7, wherein said application program is further configured to notify a user of one or more alerts associated with at least one of the selected road segments.

9. One or more computer-readable non-transitory storage media having computer-useable instructions embodied thereon to perform a method for distributing traffic information, said method comprising:
   presenting a traffic map over the Internet with an Internet browser;
   receiving user inputs to said Internet browser selecting one or more road segments displayed on said traffic map, wherein said user inputs are made via a pointing device operable to select said one or more road segments on said traffic map;
   maintaining a schedule of traffic events listing one or more future events expected to impact traffic conditions, said schedule further listing future placement of at least a portion of one or more road segments;
   generating predicted traffic occupancy or usage by predicting the impact of said one or more future events and said future placement on said traffic conditions, wherein said predicted traffic occupancy or usage is stored in a data source;
   monitoring said data source to observe one or more alerts associated with at least one of said one or more road segments, wherein at least a portion of said one or more alerts indicate the predicted traffic occupancy or usage; and
   when said one or more alerts are observed, notifying the user of said one or more alerts by presenting a dynamically-generated web page indicating at least a portion of said predicted traffic occupancy or usage.

10. The media of claim 9, wherein said user profile includes information related to routes and advisory types.

11. The media of claim 9, wherein at least a portion of said one or more alerts relate to road closures.

12. The media of claim 9, wherein at least a portion of said one or more alerts relate to traffic performance on at least one of said one or more road segments.

13. The media of claim 9, wherein said notifying the user of said one or more alerts includes altering the visual appearance of an icon.

14. The media of claim 9, said notifying the user of said one or more alerts includes generating a message to be sent to said user.

15. The media of claim 9, wherein said monitoring said data source includes periodically communicating with said data source over the Internet.

* * * * *